May 26, 1942.  A. BINKOWSKI  2,284,034
EXPANDING FISHHOOK
Filed Jan. 15, 1941

Inventor
Andrew Binkowski

By Samuel H. Davis.
Attorney

Patented May 26, 1942

2,284,034

UNITED STATES PATENT OFFICE 2,284,034

EXPANDING FISHHOOK

Andrew Binkowski, Lansing, Mich.

Application January 15, 1941, Serial No. 374,578

3 Claims. (Cl. 43—36)

This invention relates to spreading plural fish hooks, and comprises a special construction and arrangement of the portions of a fish hooks construction wherein the hooks may be brought together and baited in their contacting positions until the bait is taken by a fish, whereupon the hooks spring apart and the fish cannot become detached by its own efforts.

The accompanying drawing illustrates the individual formation and arrangement of the parts of this invention, and Fig. 1 shows all parts in their spreading, divergent V-shape positions.

Throughout the drawing and description the same number is used to refer to the same part.

The invention is composed of a unitary piece of steel spring wire. What may be termed for purposes of explanation its upper legs 1 and 2 meet at the top in Fig. 1 in a ring form return bend 3 to which a line A may be connected as shown.

Figure 1:
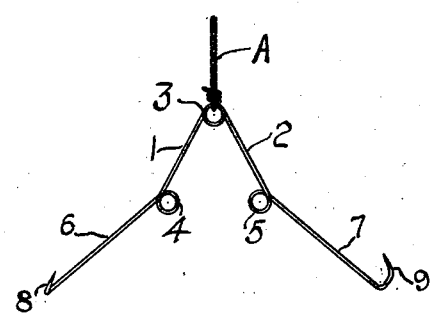
Figure 2:
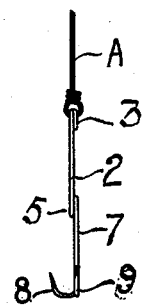
Fig. 2 is a side view of the parts shown in Fig. 1.

At a distance from the line connection each upper leg possesses a ring form bend such as the bends 4 and 5, and these bends project towards each other in Fig. 1 and lie one upon the other when the portions are brought together. From the inward bends 4 and 5 the wire extends in a slightly more divergent direction to make two lower legs 6 and 7. At the free ends, the lower legs are formed into fish hooks without barbs. The hooks are given the reference numbers 8 and 9.

Figure 3:
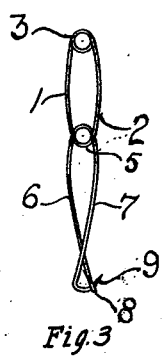
Fig. 3 represents a front view of the portions of the invention brought together, and the hooks together.
Figure 4:
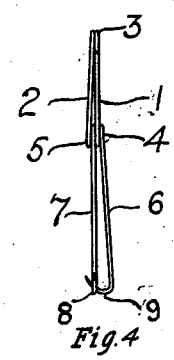
Fig. 4 is a side view of the parts set out in Fig. 3.
Figure 5:
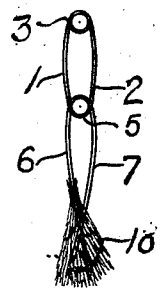
Fig. 5 is a front view similar to Fig. 3 showing the hooks baited together.

Normally, the portions are spread apart in the divergent, V-shaped positions illustrated in Fig. 1, and when in those positions the upper and lower legs are straight, but in the operation when the portions are brought towards each other against the spring force of the wire, the legs each bend slightly, as shown in Figs. 3 and 5. It will be noted that the ring bends between the upper and lower legs project inwardly and lie one over the other in those Figs. 3 and 5. It will further be noted that one lower leg is slightly longer than the other and the hooks are arranged transversely with respect to each other. When the hooks are brought together to be baited they contact and bind one to the other slightly, enough to hold the portions together for baiting, but permitting the legs to fly apart when a fish strikes or attempts to forcibly detach the bait 10. Any suitable bait may be used. Further considering Figs. 3 and 5, by constructing the invention with the intermediate rings or eyelets 4 and 5, the shanks or legs of the construction are allowed to come closer together instead of bulging outwardly, which would occur if the rings were not used. It is found also that the rings construction as set forth adds somewhat to the quickness and expanding force when the parts separate into the positions of Fig. 1. It is not intended to limit this invention to any certain material or sizes of the elements described. It may be stated also that the rings or eyelets permit the use of shorter shanks or legs with the same elastic force in operation.

Having now described this invention, I claim.

1. In a spreading plural fish hooks construction, a unitary resilient wire having an open ring form middle part constructed to be connected to a fishing line, said wire extending from said line connection to make two upper leg portions, each of said upper legs having at a distance from the said line connection portions turned inwardly to form rings projecting towards each other, the said wire being extended from the said projecting rings to make lower leg portions, the ends of said lower leg portions being formed into fish hooks projecting in different directions with respect to each other, and the said wire being normally expanded divergently in V-shape and said leg portions constructed to be brought together against the resilient force whereby said hooks may be baited together.

2. In a spreading plural fish hooks construction formed of resilient wire and having an open annular part adapted to be connected to a fishing line, said construction having portions extending from the said line connection and including ring form bends located at a distance from said line connection, said wire being extended from said ring bends to constitute terminal leg portions, said terminal portions being fashioned at their ends into fish hooks projecting in different directions with respect to each other, and said portions being normally spread apart divergently in V-shape and constructed to be brought towards each other against the elastic spreading force whereby the said hooks may be baited together.

3. In a spreading plural fish hook construction, a continuous wire having its middle portion bent into ring form adapted to be connected to a fishing line, said wire being extended from said ring to constitute upper leg portions, the ends of said upper leg portions being bent into ring forms and the said wire continued to form lower leg portions, the said lower leg portions being fashioned at the ends into fish hooks projecting transversely one with respect to the other, the said wire being adapted to expand resiliently and separate the said legs, the said lower legs being expanded divergently at a wider angle than said upper legs, and the transverse arrangement of said hooks being adapted to engage a bait applied thereto and to hold said upper and lower legs against expansion with the said rings of the upper legs one upon the other.

ANDREW BINKOWSKI.